(12) United States Patent
Moser et al.

(10) Patent No.: US 7,676,542 B2
(45) Date of Patent: Mar. 9, 2010

(54) ESTABLISHING A COLLABORATION ENVIRONMENT

(75) Inventors: Martin Moser, Sandhausen (DE); Stefan Mueller, Sinsheim (DE); Martin Kreyscher, Heidelberg (DE); Christian Nester, Heidelberg (DE)

(73) Assignee: SAP AG, Walldorf (DE)

( * ) Notice: Subject to any disclaimer, the term of this patent is extended or adjusted under 35 U.S.C. 154(b) by 1084 days.

(21) Appl. No.: 10/308,922

(22) Filed: Dec. 2, 2002

(65) Prior Publication Data

US 2004/0107249 A1     Jun. 3, 2004

(51) Int. Cl.
G06F 15/16 (2006.01)
G06F 15/177 (2006.01)
G06F 15/173 (2006.01)

(52) U.S. Cl. .................. 709/204; 709/220; 709/223; 709/225

(58) Field of Classification Search ......... 709/203–204, 709/206–207, 220, 223, 225
See application file for complete search history.

(56) References Cited

U.S. PATENT DOCUMENTS

| | | | |
|---|---|---|---|
| 4,763,026 A | 8/1988 | Tang et al. | |
| 5,818,616 A * | 10/1998 | Kawai | 398/72 |
| 5,848,415 A * | 12/1998 | Guck | 707/10 |
| 5,900,870 A | 5/1999 | Malone et al. | |
| 5,909,543 A * | 6/1999 | Tanaka et al. | 709/204 |
| 5,960,404 A | 9/1999 | Chaar et al. | |
| 6,016,146 A | 1/2000 | Beer et al. | |
| 6,016,478 A * | 1/2000 | Zhang et al. | 705/9 |
| 6,047,288 A | 4/2000 | Kurosawa et al. | |
| 6,233,600 B1 | 5/2001 | Salas et al. | |
| 6,295,536 B1 | 9/2001 | Sanne | |
| 6,304,886 B1 | 10/2001 | Bernardo et al. | |
| 6,343,313 B1 * | 1/2002 | Salesky et al. | 709/204 |
| 6,363,352 B1 * | 3/2002 | Dailey et al. | 705/9 |
| 6,434,599 B1 * | 8/2002 | Porter | 709/204 |
| 6,471,521 B1 | 10/2002 | Dornbush et al. | |
| 6,513,152 B1 | 1/2003 | Branson et al. | |
| 6,594,664 B1 | 7/2003 | Estrada et al. | |
| 6,636,888 B1 * | 10/2003 | Bookspan et al. | 709/203 |
| 6,636,889 B1 | 10/2003 | Estrada et al. | |
| 6,732,103 B1 * | 5/2004 | Strick et al. | 707/10 |
| 6,744,447 B2 | 6/2004 | Estrada et al. | |
| 6,750,881 B1 | 6/2004 | Appelman | |
| 6,859,212 B2 | 2/2005 | Kumar et al. | |
| 7,028,262 B2 | 4/2006 | Estrada et al. | |

(Continued)

OTHER PUBLICATIONS

"eRoom Technology Introduces Next Generation Dital Workplace with Unveiling of eRoom Version 6.0" *Business Wire*, Feb. 19, 2002, pp. 1-17.

(Continued)

*Primary Examiner*—Hussein Elchanti
(74) *Attorney, Agent, or Firm*—Mintz, Levin, Cohn, Ferris, Glovsky & Popeo, P.C.

(57) ABSTRACT

Establishing an electronic collaboration area includes receiving from an application a collaboration area request that identifies a collaboration area template structure, receiving one or more collaboration area parameters relating to the collaboration area template structure, and establishing a collaboration area having content that is a function of the collaboration area template structure and the received one or more collaboration area parameters, the collaboration area being accessible to a plurality of collaboration area participants.

14 Claims, 6 Drawing Sheets

U.S. PATENT DOCUMENTS

| | | |
|---|---|---|
| 7,124,164 B1 | 10/2006 | Chemtob |
| 7,159,178 B2 | 1/2007 | Vogt et al. |
| 7,237,002 B1 | 6/2007 | Estrada et al. |
| 2001/0048449 A1 | 12/2001 | Baker |
| 2002/0002586 A1 | 1/2002 | Rafel et al. |
| 2002/0052954 A1 | 5/2002 | Polizzi et al. |
| 2002/0097267 A1 | 7/2002 | Dinan et al. |
| 2002/0119434 A1 | 8/2002 | Beams et al. |
| 2002/0129106 A1 | 9/2002 | Gutfreund |
| 2002/0178290 A1 | 11/2002 | Coulthard et al. |
| 2003/0023677 A1 | 1/2003 | Morison Zuill et al. |
| 2003/0050986 A1 | 3/2003 | Matthews et al. |
| 2003/0063124 A1 | 4/2003 | Melhem et al. |
| 2003/0110448 A1 | 6/2003 | Haut et al. |
| 2003/0117437 A1 | 6/2003 | Cook et al. |
| 2003/0156134 A1 | 8/2003 | Kim |
| 2004/0003371 A1 | 1/2004 | Coulthard et al. |
| 2004/0104933 A1 | 6/2004 | Friedrich et al. |
| 2004/0107249 A1 | 6/2004 | Moser et al. |
| 2005/0138118 A1 | 6/2005 | Banatwala et al. |
| 2006/0005163 A1 | 1/2006 | Huesken et al. |

OTHER PUBLICATIONS

Kregel, Mark, "EMC eRoom SMB Edition", EMC Corporation, 2006, pp. 1-36.

* cited by examiner

ESTABLISHING A COLLABORATION ENVIRONMENT

BACKGROUND

The following description relates to a method and system for simplifying the creation of a computerized collaboration area or environment.

Many collaboration tools exist today to help computer users communicate with other users in other locations in an efficient manner. For example, e-mail applications allow people to communicate in an asynchronous manner, whereby one person can send a message and another person can later reply to the message. Chat applications allow similar communications to take place in real-time, or synchronously. Network meeting applications have also been developed to provide a virtual space in which to hold real-time, synchronous meetings. Such applications can offer live whiteboards on which meeting participants can provide input, presentations or other objects for participants to review and edit, and chat services for communications among the participants. The applications can also provide, or be integrated with, teleconferencing or video teleconferencing services.

More recently, collaboration environments known as virtual rooms have been developed to allow teams of workers to interact with each other, either synchronously or asynchronously. For example, two groups attempting to negotiate a contract may be provided with a virtual room in which to hold the discussions electronically. The room may initially be provided with a draft contract, and various team members may be given access to the room so that they may review, edit, annotate, and comment on the contract and on the comments and edits of others. Initially, this process may take place asynchronously, whereby each person visits the room at his or her convenience. As the contract comes closer to being finalized, synchronous sessions, or meetings, may be established, so that multiple members are viewing the room at one time, and are able to communicate with each other, such as by teleconference, video teleconference, or chat.

SUMMARY

This document discloses a method and system that assists in establishing a virtual collaboration area. In one aspect a computer-implemented method of establishing an electronic collaboration area is disclosed. The method comprises receiving a collaboration area request that identifies a collaboration area template structure, receiving one or more collaboration area parameters relating to the collaboration area template structure, and establishing a collaboration area having content that is a function of the collaboration area template structure and the collaboration area parameters, the collaboration area being accessible to a plurality of collaboration area participants. The collaboration area request may be received using a portal application, and the collaboration area may be produced as an area in the portal application. The collaboration area may also comprise a plurality of pages and a plurality of views on one or more of the plurality of pages.

In one example, the collaboration area template structure may comprise a plurality of default values, and the collaboration area parameters may overwrite one or more of those values. Also, the collaboration area parameters may specify collaboration services to made available to the collaboration area participants, and may also specify access roles that are available in the collaboration area. In addition, they may specify one or more participants and a role to be assigned to each. Invitations may also be generated for the participants, and customization commands may be received after establishing the collaboration area, to customize the operation of the collaboration area. The customization commands may comprise commands to select additional participants for the collaboration area. In addition roles may be associated with the to control access by one or more participants to the collaboration area. Before the collaboration area request is received, a user of the application may be provided with a list of collaboration area template structures.

A second collaboration area request that is associated with the first collaboration area may also be received, and may identify a collaboration area template structure. Parameters related to the template structure may also be received, and a second collaboration area within the collaboration area may be established, and may comprise content that is a function of the collaboration area template structure and the received one or more collaboration area parameters. The second collaboration area may be accessible to a subset of the participants in the collaboration area. In addition, the second collaboration request may be received from a different application than the collaboration request.

In another example, a method for producing a collaboration area in a portal is discussed. The method comprises accessing a list of stored collaboration area template structures, receiving through the portal a selection of one structure from the list; providing through the portal a parameter list having a plurality of entries associated with the one structure, receiving values for the plurality of entries, and mapping the values to the collaboration area template structure to form an instance of a collaboration area in the portal. A plurality of collaboration area participants may also be identified and may be provided access to the collaboration area through the portal. The participants may also be assigned to a role that controls their access to the collaboration area.

The systems and techniques described here may provide one or more of the following advantages. A user may be guided through the complex process of establishing a collaboration area using an automated set-up process, which may include a question-and-answer format. The user may also add creation parameters to the area at the time it is created. As a result, the user may be more likely to establish such an area, do a more complete job of establishing the area with fewer errors, and establish the area according to a configuration that is recognizable to, and easily used by, the visitors to the area.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to systems that allow a computer user or users to establish a collaboration area for use by other computer users (who are together participants in the collaboration area).

Figure 1:
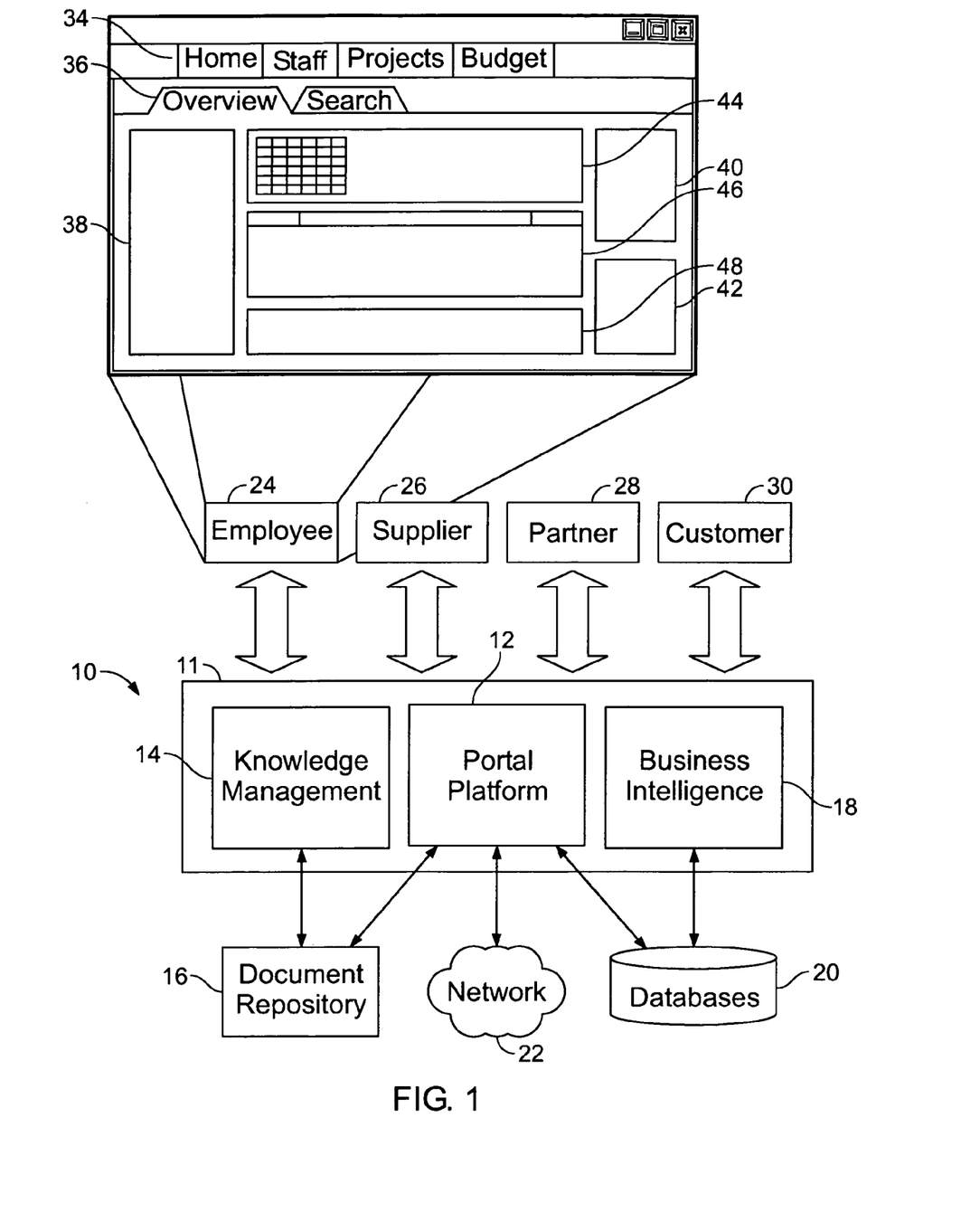
FIG. 1 is a block diagram of a portal system that may be used to establish collaboration sessions.

FIG. 1 is a block diagram of a portal system 10 that may be used to establish collaboration sessions that occur in collaboration areas. In the pictured example, system 10 comprises a portal 11 that is capable of presenting a variety of information from various disparate sources through a unified visual interface. Portal 11 operates around a central portal platform 12, which provides tools and processes for interacting with various data stores, and for integrating the disparate data so that it can be presented to various users in a customizable or consistent format.

Portal platform 12 obtains data from various sources. For example, databases 20 may store various types of information, such as structured business data stored in one or more flat file or relational databases, or other types of data. Portal platform 12 may access databases 20 directly, or may employ business intelligence module 18 to access and present the information. As an example, the information in databases 20 may comprise sales and manufacturing data in a business warehouse of an enterprise resource planning (ERP) system. Portal platform 12, in concert with business intelligence module 18, may access and aggregate the appropriate data so as to present a simple graph of revenue and expense trends for a company. In addition, information needed to operate and configure portal platform 12

Data also may be accessed from a document repository 16, either directly by portal platform 12 or indirectly using knowledge management module 14. As an example, document repository 16 may store an enterprise's various manufacturing specifications. Portal platform 12, with knowledge management module 14, may search for documents that might be relevant for an ongoing engineering project. Consequently, both structured and unstructured data may be accessed from other locations using a network 22, such as the Internet.

System 10 can present data to various users in custom visual formats, referenced here as portal displays. Generally, the displays may be configured according to the role played by the person who is viewing the portal. For example, employee portal display 24 may correspond to an employee of a company or other enterprise and may provide the employee with access to information the employee needs to conduct his or her job, such as an internal telephone directory, product ordering forms, e-mail, and scheduling. Likewise, supplier portal display 26 may provide a supplier of the company with information about the company's current and expected procurement needs, along with payment information on the supplier's accounts. Partner portal display 28 may provide access to information that is needed by a business partner, such as information regarding a product (e.g., design documents and development schedule) that is being developed with the partner. Finally, customer portal display 30 can provide access to information such as a product catalog and product shipping status.

Employee portal display 24 is shown in more detail to provide an example of how portal content may be presented to a computer user in a form that can include a collaboration area. Employee portal display 24 can provide various presentations of information. The information for the collaboration area or room is organized hierarchically, where the entirety of the information provided through the room is joined together in a workset. The workset may contain a number of components, which may be organized in hierarchical folders. In general, a work set is a group of objects that are related in a way such that they can carry out the functions of a particular component, such as a collaboration area. Various folders within the workset may represent pages that are displayed to visitors of the collaboration area. For example, one page may show a welcome screen for the area, other pages may show documents that are being edited in the area, and others may show scheduling tools for the project associated with the area. Each page may be further divided into individual views, which are areas of a page that display a particular unit of information, such as a calendaring application, a task list, a document, or information built up from a general view using data specific to the particular user, such as a local weather forecast.

The information provided by employee portal display is role-based—it depends on the employee's position and interests within the enterprise. A portal may have a number of generic roles associated with it that define the worksets that will be presented to a particular class of users, and the permission that those users will have with respect to the workset. As an example, a portal may have a role assigned for a CEO of the organization. Users assigned that role may be provided with high-level overview information on the organization when they access the portal. They may also be given only permissions to review information, but not to change it.

Roles may also be assigned more locally, such as for a particular collaboration room. Thus, the role may define the pages within a collaboration area that may be accessed and the level of access that may be provided. For example, the user who creates the area may assign herself the role of owner or project leader, and may thus have full access to every page of the area, along with the ability to edit the area, add and remove participants, and change the permissions for the participants. In addition, permissions or privileges can be delegated, such as if the user who creates the area assigns another user to be the owner of the area. Also, multiple users may have full privileges, such as co-team leaders.

A user can select a particular display using top-level navigation bar 34 and second-level navigation bar 36. Top-level navigation bar 34 provides access to the various worksets that are available to the user, such as home page displays, displays relating to staff, displays that show information about projects, and displays that show information about budgets. In the example shown in FIG. 1, the "HOME" category is selected, as would be indicated, for example, by a grayed-out background. Each category may comprise a number of individual pages, where not all of the pages may be displayed at once. Thus, as shown, the pages can be presented as tabs using second-level navigation bar 36. Also, each tab may have a number of sub-pages, which may be accessed through a list of hyperlinks. In the example shown, the "communications" page of the "home" category has been selected for display. The "communication" may also have various sub-pages that deal with various aspects of communication.

Some examples of views that may be made available to a user having a particular role are shown in FIG. 1. These views may be moved and resized, and may otherwise perform like independent windows. Generally, however, views do not have as many navigation tools and other visual overhead as would be presented in a window. Also, a view may be joined onto a page with other views, so that the views move together with the window in which the page is being displayed. For example, view 38 might be configured to show various news headlines in the company's industry so that the user can keep up with relevant, current events. The view 38 may be represented generically in code, and the user's portal may supply particular information relevant to the user so as to create a personalized instantiation of the view (such as a local weather display).

In addition, the user may be provided with a calendar view 44 to establish and maintain appointments. Calendar view 44 may present data from a standard scheduling application (e.g., Microsoft Outlook) in a form that fits into display 24. Calendar view 44 may be repeated from other areas of the portal, do that the user is presented with a single interface for scheduling operations.

Message view 46 may show the user's e-mail in-box or other appropriate messaging window, and travel window 48 may show the status of various travel arrangements for the user. These views are merely illustrative, and various other views could be provided in addition to or instead, to display other sorts of information relevant to the user. In addition, the views may be updated in real-time or near real-time, such as by pushing changes to the display, so that the user is kept up-to-date. Also, the user may be able to move, resize, delete, and insert windows so as to create a customized portal.

In addition to providing users with access to data, system 10 may also present information in a manner that allows for collaboration among users of system 10. For example, conference view 40 may provide a running chat window or the video portion of a live teleconference. Likewise, presentation view 42 may show a document or other object that is the subject of an ongoing collaboration session, such as a WebEx meeting. Other views may be provided so as to form a collaboration area, or collaboration room. For example, one page may be configured to display a CAD drawing of a product that is being co-developed with a number of consultants. Views may be provided so that each consultant may visit the collaboration room at his or her convenience, may leave comments and annotations on the drawing, and may respond to other comments from other participants who have access to the collaboration room.

Figure 2:
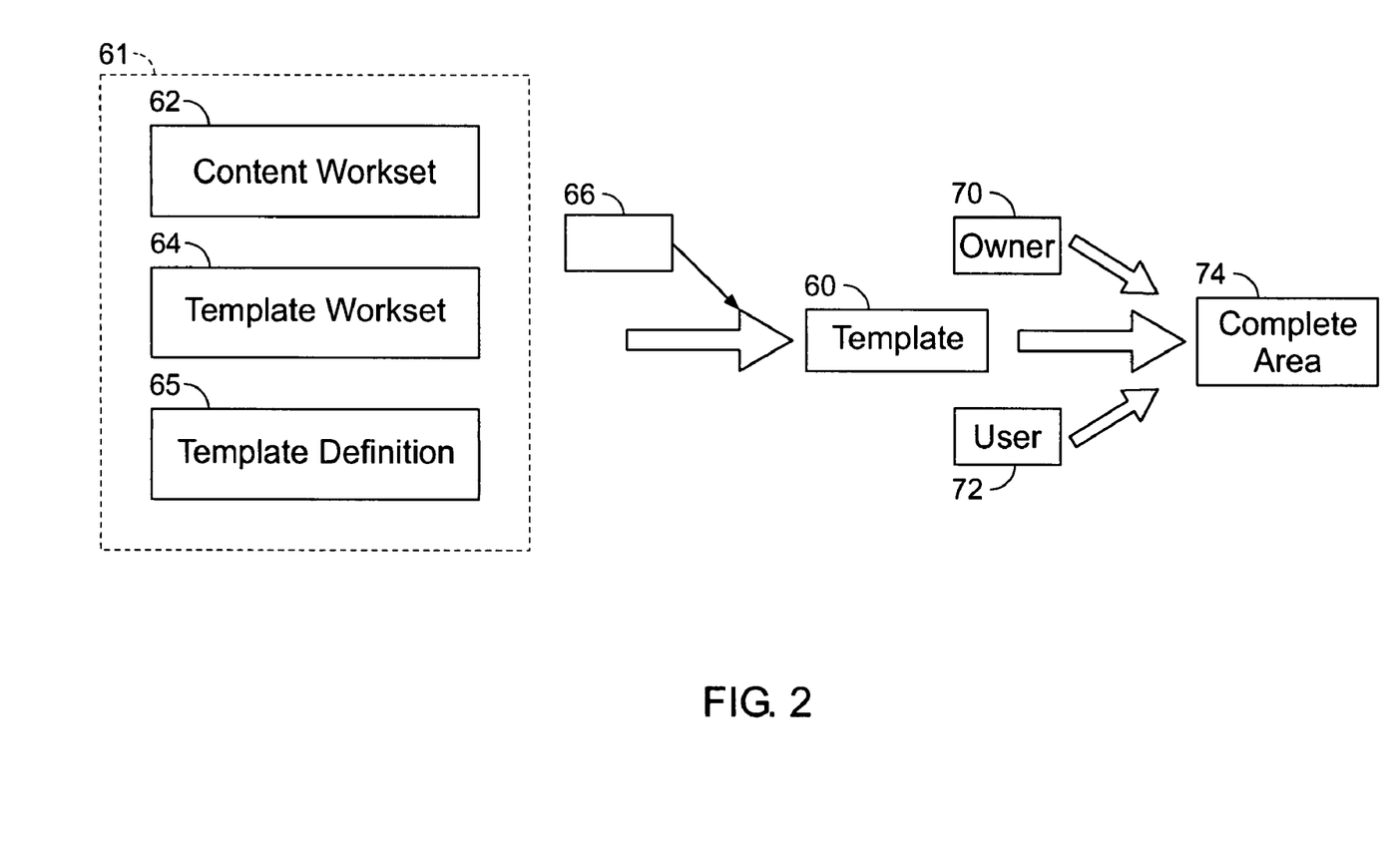
FIG. 2 is a block diagram showing the relationship of various information that may be used in creating a collaboration area from a template.

FIG. 2 is a block diagram showing the relationship of various information that may be used in creating a collaboration area from a template 60. The template 60 is a general definition of the content, structure, and roles of the collaboration area, such that it can be used by various users to form a substantially complete area for a given project.

The template 60 is defined by a content workset 62, a template workset 64, and a template definition 65. The content workset 62 defines what content is available in the collaboration area. For example, the content workset 62 may be arranged in a hierarchy of pages and views, where the pages represent a page that can be accessed by at least some participants in the collaboration area, and the views represent what those participants will see in each area. The template workset 64 defines roles of users that have access to the area, and can take a variety of forms. Each role may be represented as a folder under the workset. The roles may be linked to the content workset 62, so that, for instance, a "project lead" role may be provided full access to all of the content in the content workset. A template definition 65 comprises a description of a particular template, a set of properties for rooms within the area (e.g., room name and whether users are notified by e-mail when they are invited to the area), and a rule set that defines how a particular area is created by mapping the room properties on the properties of the views that make up each area. The content workset 62, template workset 64, and template definition 65, in their general forms, combine to form a template structure 61. In one form, the content workset 62 may be a fundamental element of a portal system through which the collaboration area is accessed.

When a template is created, the links from template workset 64 to content workset 62 may result in additional pages being created to form template 60. As an example, if one page in content workset 62 contained a CAD drawing of a product that the collaboration team is to develop, and some members were to have full viewing and editing capabilities on the drawing while others were to only have viewing capabilities, the templating process could create two different pages in template 60. One of the pages would provide for full interaction (e.g., editing and viewing), while the other would provide for partial interaction (e.g., viewing only). One group of team members (as defined by their roles) could be given access to the former page, while another group could be given access to the latter page. Alternatively, a single page may be created, with varying accessibility that depends on the role of the participant trying to review the page.

Property mappings 66 represent various specific parameters about template 60. In particular, a template structure 61 may be stored in the system generally as a combination of the content workset 62 and the template workset 64. When a user seeks to create a new collaboration area, the template structure 61 may be copied to a part of the system that is specific to the collaboration area that is being formed. Property mappings 66 allow area-specific changes to be made to the template structure as it is being copied so that the subsequently-formed template 60 is a customized version of the original template structure.

For example, when a user selects a particular template to be created, the system may prompt the user for information about the intended collaboration area. The information may be basic, such as the name of the area and the owner of the area. It may also be more detailed, such as the types of possible content that the user would like to make available in the area, the roles for the area, and the permissions to be given each role. The requested information may depend on the organization and make-up of the template structure 61. More complicated template structures may be accompanied by an interactive information gathering process in which the user may provide values for various parameters and may be guided through a question-and-answer style process Using the information provided by the user, the system can copy selective portions of the template structure 61 to the system for the particular collaboration area, and can provide information specific to the collaboration area that overrides default information in the template structure 61. In this manner, a specific instantiation of the template 60 may be formed with little effort by the user.

Processing of the template 60 after it is initially created so as to create a complete area 74 is shown by owner modifications 70 and user modifications 72. During the templating process, the system might request only limited information from the owner, thus generating a collaboration area, as an effort in making the collaboration area creation process less laborious. As a result, the owner may want to add, delete, or modify features after the initial collaboration area has been created. For example, the owner may want to create a role for the area that was not supplied by the template structure 61, or may want to add additional collaboration services (such as chat or instant messaging) that are not included in the template structure.

An owner may also pre-staff a collaboration area, by assigning various participants to the area before inviting any participants to the area. The owner may, in such a situation, review what the room will look like and prepare the area with the various documents and other resources that will be available in the area before allowing anyone else in.

In addition, user modifications 72 may be performed on the template. For example, a team member with appropriate permission may alter the permission of other members. In addition, team members can create extra pages or other objects to be made available in the collaboration area. For example, an engineer may wish to add a page directed to a particular subsystem on a project. The engineer could create the page, assign content (such as CAD drawings and chat areas) to it, provide services (such as annotations and instant messaging), provide certain team members with permissions to access the page and others with permissions to edit the information on the page, and link the page to the collaboration room. The engineer could do this using the templating process described above to help automate the process of creating the page, and the templated page could then be appended to the template for the collaboration area.

In this manner, basic building blocks for a portal, such as pages, views, and worksets, may be used to define a template for a collaboration area. An area may be created by copying these elements and giving the area its individual form by writing specific values to the various parameters for the area. The process may be performed in a manner that is similar for other processes that provide custom instantiations of a generic concept (such as local weather views or personalized news views). The values for instantiating the views may be those provided by the user when creating the room, or can be generated based upon the input provided by the user. In addition, roles can be identified with respect to the area, and participants in the area may be assigned roles so as to control their access in the various parts of the area. An enterprise thus may focus its attention a single time on creating a template for an area, and subsequent creation of areas from that template may be much easier. In addition, third-parties may also provide ready-made templates. As such, a collaboration area may be created as an integral part of a portal application.

Figure 3:
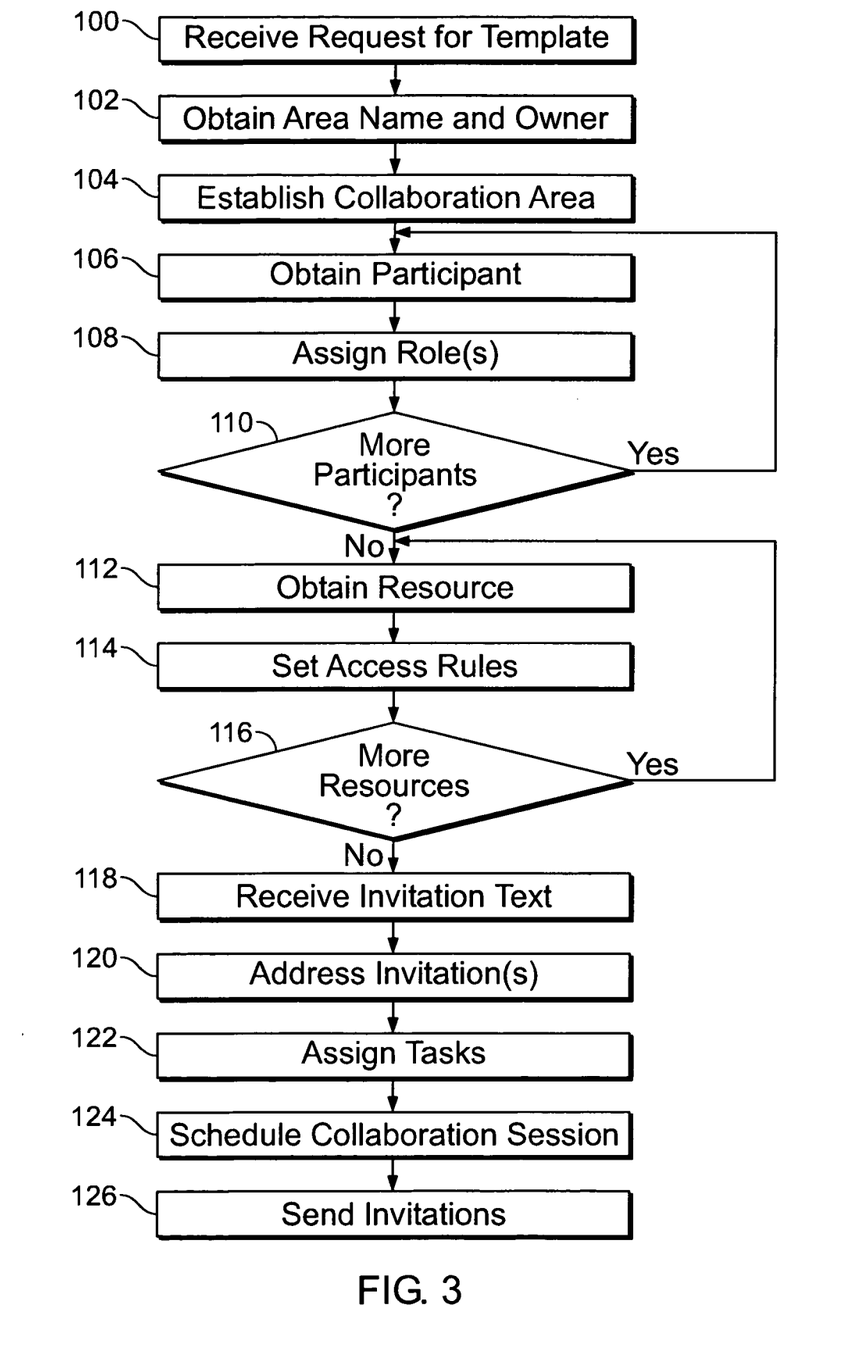
FIG. 3 is a flowchart of a process for using a template to set up a collaboration area.

FIG. 3 is a flowchart that shows a process for using a template to set up a collaboration area. At step 100, the system receives a request from a user to provide a template. The system may initially provide the user with a list of available templates, and the user may then select one template from the list. Each template is associated with a number of preset underlying roles, work sets, views, and processes for a general application. For example, a product development template may be configured to have participants in the roles that correspond to a lead engineer, design engineer, patent attorney, and technical marketer. Each of the roles may also have default permissions for the collaboration area. For example, the technical marketer may have the ability to comment on a design, but may be denied the ability to change it. The person who creates a particular area may select from a number of available participants that are identified as being available for each role when setting up a collaboration area for a project. In a like manner, the person may customize or alter other default settings that are associated with the template.

At step 102, the system obtains a name and owner for the collaboration area. The name may be used to identify the area, so that participants can know where to go to work on materials related to the project. The owner in the example is the person who can change attributes relating to the roles, views, work sets, and activities, such as by adding other participants to the area or changing the access privileges of certain participants. The owner can be the person who establishes the area or its can be someone else.

Once an owner and name for the area have been established, a blank template can be presented to the user, as shown at step 104. As one example, the template may contain a listing of the default roles for the area, and the user may be given an opportunity to fill the roles, to add or delete roles, and to change the attributes for the roles. In addition, the user can be presented with the various views that will be presented to a participant in the area, and may move the views, add or delete views, or otherwise make changes to the visual impression of the area. These aspects of the template can also be modified as part of the template creation process, such as by offering the user various options for views and roles relating to the collaboration area.

An example of one modification that the user may make is shown at steps 106-110. At step 106, the user may obtain a participant from among the various available participants. For example, the user may be presented with an "address book" showing every available person in an organization, and perhaps individuals from another organization if the collaboration area is meant to be accessed by that other organization. The user may select an individual and may then assign them to one of the pre-defined roles for the collaboration area, as shown at step 108. Alternatively, the user may first select a role, may then be given a list of individuals who are identified as eligible to serve in that role, and may select one of those individuals. The user may assign roles until all of the roles have been filled or until the user is otherwise finished assigning roles, as shown at step 110. A later user may also be provided with the opportunity to assign one or more roles, and the role assignment process may also include a workflow component, such as one by which proposed participants are selected but are not allowed to be participants until their supervisors have approved.

A user may also assign certain resources to the collaboration area, so that participants may access them. For example, as shown at step 112, the user may assign one or more draft contracts to the area, such as by copying the files for those contracts into folders that can be accessed from the area. Other resources can include various documents and services that can be made available in the collaboration area. The user may also set rules to limit the ability of participants to view or edits the resource, as shown at step 114. The user may keep adding resources until all of the necessary resources are in the collaboration area, as indicated by step 116. Other resources may also be added later, either by the user or by participants in the collaboration area. In addition, resources may be created in the collaboration area. Furthermore, the user may select from a number of collaboration service providers that will be available to the participants.

The system may also receive text from the user to be sent in an invitation to the participants, as shown at step 118. For example, the user may explain to the participants what the collaboration area will be used for, and what each participant is expected to do in the area. The invitation may be sent to all of the participants, or to a subset of the participants. In addition, the user may assign tasks to various participants (step 122) and may schedule a collaboration session (step 124), such as a team kick-off meeting. Deadlines may be assigned to the tasks, such as by scheduling the initial meeting as the deadline, so that participants complete the tasks (such as reviewing certain documents) before the meeting. Finally, the system may send the invitations (step 126).

Figure 4:
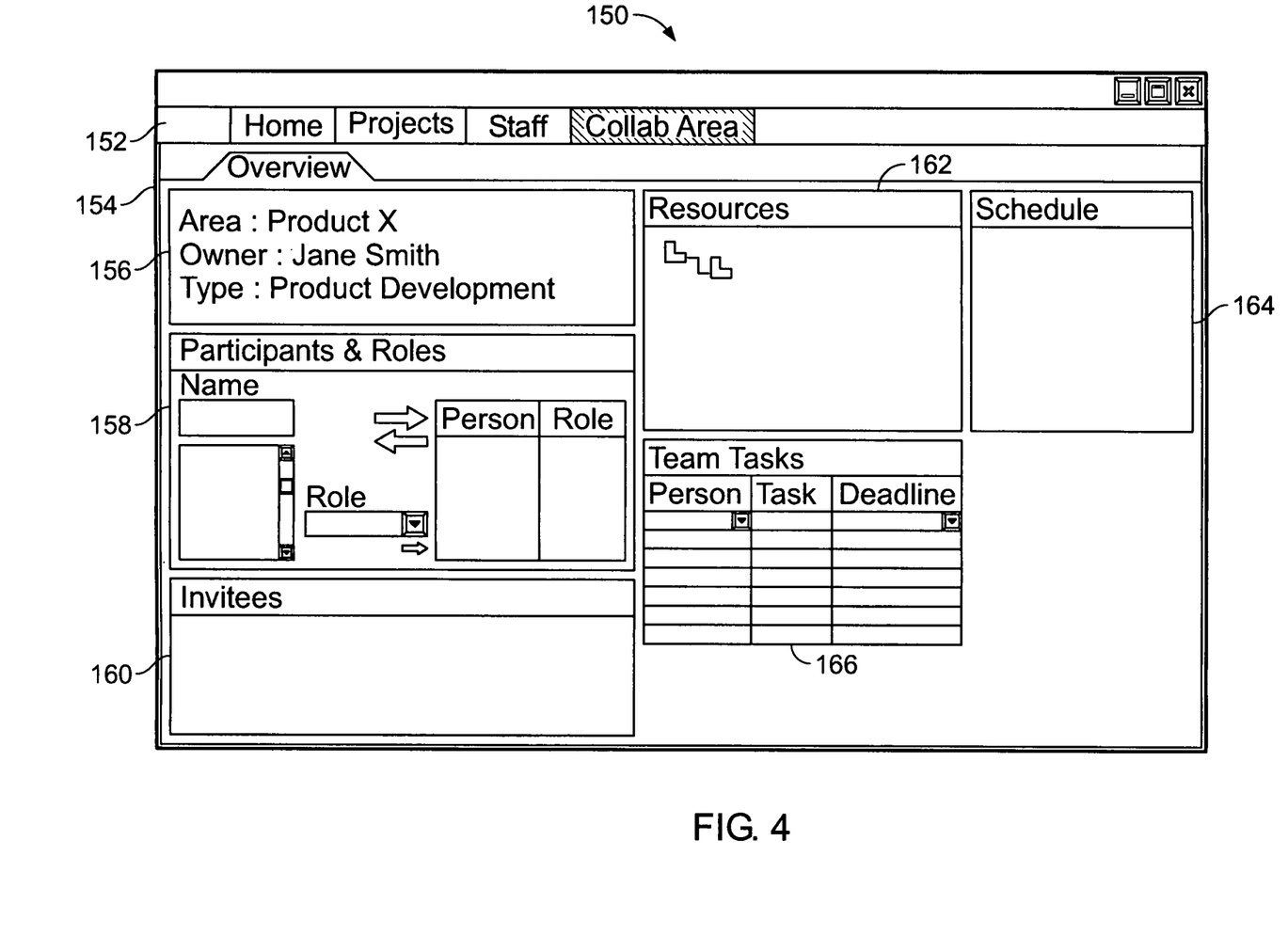
FIG. 4 is a screen shot of a collaboration area template input form.

FIG. 4 is a screen shot of a collaboration area template input form 150. Form 150 may be used to carry out a process like that described in FIG. 3. Although form 150 is shown as a single page in a portal with multiple input areas, it could also be presented in other manners, such as by a series of dialogue boxes that question a user for information that can be used to fill in a general template.

Form 150 is shown as part of a portal presentation. At the top of the screen, top-level navigation bar 152 shows that the collaboration area feature has been selected for review by the user. Second-level navigation bar 154 shows, through its "Overview" tab, that the user is currently reviewing a general outline of a collaboration area.

The display shows a number of views that relate to a collaboration area that the user is in the process of establishing. Main view 155 shows the name that the user has assigned to the collaboration area, the owner of the area, and the type of template used to establish the area. As shown in the figure, each element of main view 155 has already been set. However, the values for each element may initially be blank and the user may provide the input, such as through drop-down boxes. For example, the "Type" entry may be blank initially, and the user may pick one type from among a list of the available types of templates.

Participants and roles view 158 provides the user with an opportunity to give various people access to the collaboration area. A list of available participants may be provided on the left, and the user may select arrows to add people from the list to a list of actual participants on the right. Actual participants may be removed in a similar manner. Also, roles may be assigned to the participants, such as by using a "Roles" drop-down box. For example, a participant who has already been added to the collaboration area may be highlighted, and a role may be selected for the participant from among the available roles (which may be limited by roles that are generally available to that person). Alternatively, if the template has already provided a list of roles, one of those roles may be highlighted, and the list of available participants may be filtered upon highlighting of the role to include only participants who can serve in the particular role. Invitees area 140 allows the user to select which people, from among those that have been identified as participants, will be provided with an initial invitation to the collaboration area.

Resources view 162 provides an area in which the user may add resources to a collaboration area. As shown, resources area 162 is presented as a simple hierarchical file manager having nested folders. Thus, the user may drag files from another location into the folders, and may also create new folders. Other functionality for moving, creating, and copying resources may also be provided using any of a number of well-known mechanisms.

Schedule view 164 provides an area in which the user may establish various events, such as meetings, for the collaboration area participants. Schedule view 164 may be provided with typical calendar functionality, so that the user can, for example, establish a kick-off videoconference, a weekly e-meeting, or any other event.

Team tasks view 166 provides an area in which various participants may be assigned tasks, and deadlines may be assigned for those tasks. As a result, a workflow process may be started by which team members are provided with messages regarding the progress toward completing tasks, and the system may be consulted to add or edit tasks, to signal the completion or partial completion of a task, or to review the number of outstanding tasks and their progress toward completion.

Figure 5:
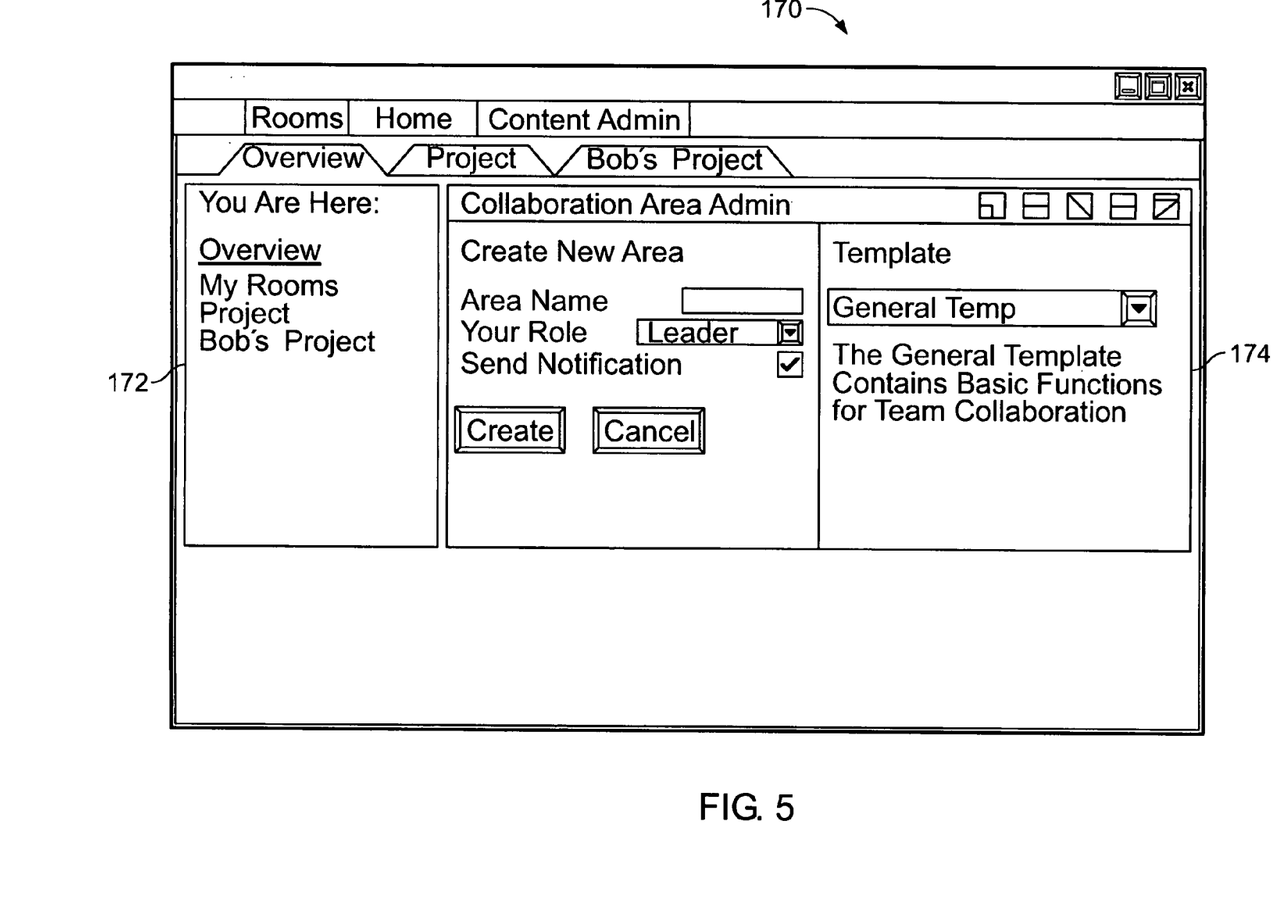
FIGS. 5-6 are screen shots of a collaboration area during its creation using a template in a portal.
Figure 6:
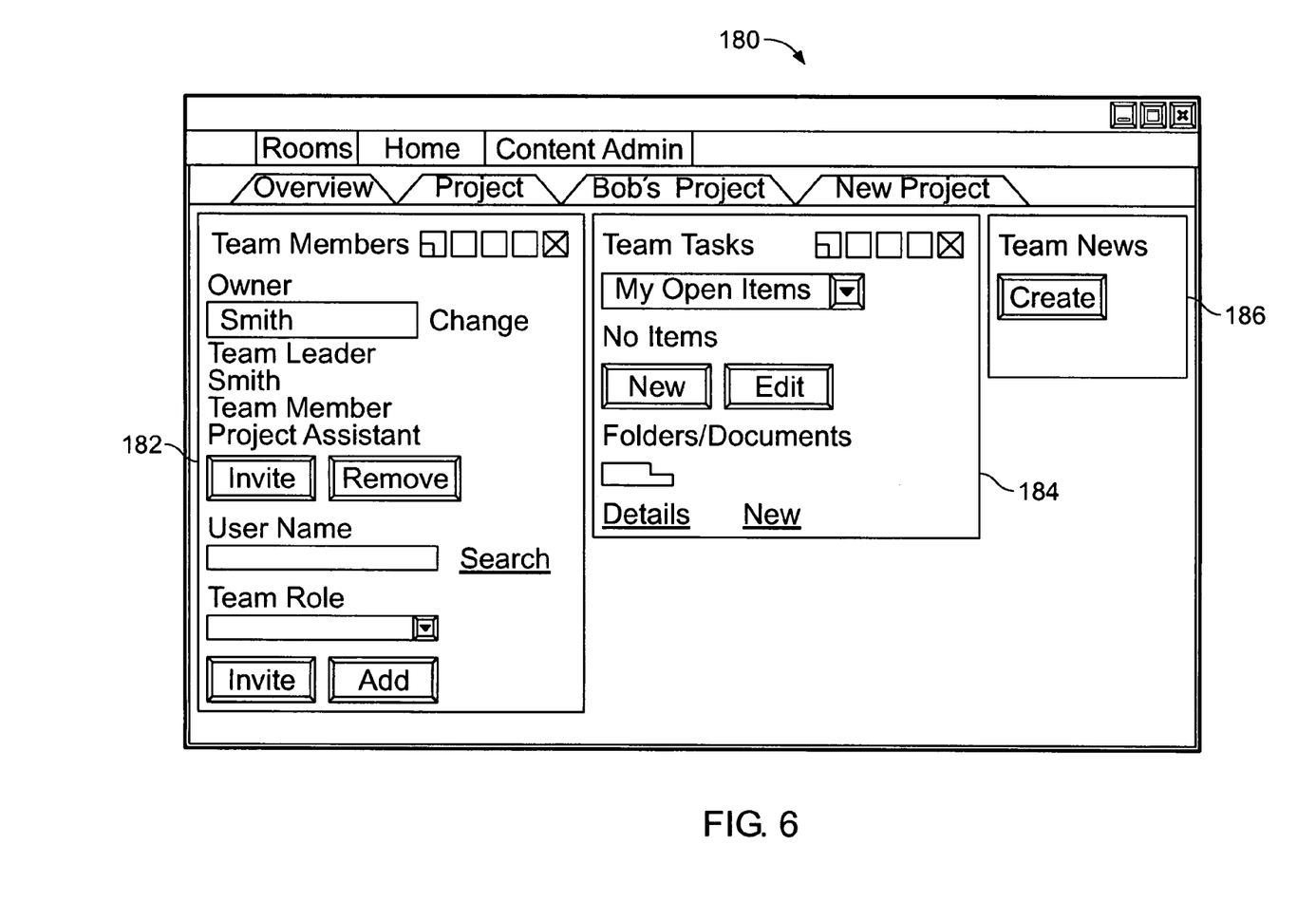

FIGS. 5-6 are screen shots of a collaboration area during its creation using a template. These figures are similar to the display of FIG. 4, but show the collaboration area being created in two different screens. In FIG. 5, a display 170 shows general input parameters that a user can supply in initially creating a collaboration area. Navigation view 172 provides a number of links that the user may select to move around in the portal that is displayed in part on display 170.

Collaboration area set-up view 174 provides the user with an opportunity to enter various parameters to control the templating process. For example, the user may select a template from a drop-down list of templates, and the set-up view 174 can provide a brief description of the template. The user may also provide a name for the area, the user's role in the area, an indication whether notifications of the area's creation should be sent, and boxes for creating the area or canceling the transaction. Various other information, both simple and complex, may also be elicited through set-up view 174, depending on the information that is needed to generate a specific collaboration area from a template.

FIG. 6 shows a display 180 of a collaboration area that has been initially created from a simple template, such as by way of the form in FIG. 5. Participant view 182 provides the area's owner with the ability to add new participants to the collaboration area and assign those participants to particular titles that may correspond to underlying roles that control the user's subsequent access to the collaboration area. As shown, the owner (one Smith) is currently the only participant in the collaboration area, and is assigned as the Team Leader. Two other assignments—Team Member and Project Assistant—are also readily available under the template that created the area. News view 186 can be a standard portal news feed having parameters assigned to it so as to cause news relevant to the project being carried out in the collaboration area to be displayed. Collaboration area operation view 184 shows several components of the collaboration area that allow the team members to collaborate on a project. For instance, team members may assign tasks to each other. In addition, the owner or other collaboration area participants can add documents to the collaboration area and organize them in a folder hierarchy so that the team may review, annotate, comment on, or edit the documents.

As shown, the various components used to create a collaboration area from a template, and the components themselves, can be implemented using standard portal elements. For example, various portions of the collaboration area may be displayed as portal views on particular portal pages.

The systems and techniques described here may provide one or more of the following advantages. The template presents a simplified system and method for establishing a collaboration area. It can relieve a user of the need to identify the various roles that might have to be associated with a particular project, and the need to assign attributes to the roles and the other elements of a collaboration area. It can save additional time and effort if a user modifies an existing general template to form a more particular template that can then be used by other users. In addition, it can work with standard portal technology so that the user can avoid having to learn a new interface, and has all of the available collaboration area resources in convenient reach.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss operation though a portal, but any of a number of access systems and methods may be used to establish and manage collaboration sessions. The logic flow depicted in FIG. 3 does not require the particular order shown, or sequential order, to achieve desirable results. For example, modifications to a general template may be made in any appropriate order, and may be performed at many different places within the overall process. Likewise, the components shown in FIGS. 1 and 2 can be combined or rearranged, or provided different labels. Other embodiments may be within the scope of the following claims.

What is claimed is:

1. A computer-implemented method of establishing a collaboration area that facilitates collaboration on a project between members of an enterprise, the method comprising:

receiving from an application, at a one or more portal computers, a collaboration area request that identifies a collaboration area template structure for establishing the collaboration area the collaboration area template structure comprising a content workset and a template workset, the content workset defining a default set of content available in the collaboration area, the template workset defining a plurality of preset roles that are assignable to users who access the collaboration area, each of the plurality of preset roles comprising a different a set of default permissions to access one or more resources of the collaboration area;

receiving, at the one or more portal computers, collaboration area parameters comprising a name of the collaboration area, a designation of an owner of the collaboration area, a subset of the default set of content to be made available to each of the plurality of roles, and an assignment of users of the collaboration area to one or more of the plurality of preset roles, the assignment of authorized users comprising assigning a first member of the enterprise to a first of the plurality of preset roles if the first member's position within the enterprise is sufficient for the set of default permissions of the first of the plurality of preset roles and a second member of the enterprise to a second of the plurality of preset roles if the second member's position within the enterprise is sufficient for the set of default permissions of the second of the plurality of preset roles;

mapping the collaboration area parameters to the collaboration area template structure to modify the default set of content and the set of default permissions associated with the plurality of preset roles in accordance with requirements of the project;

establishing the collaboration area in accordance with the collaboration area template structure modified by the mapped collaboration area parameters;

providing, to the owner via an owner display portal, access to all of the default set of content; and providing access to the subset of the default content associated with the first of the plurality of preset roles to the first user and access to the subset of the default content associated with the second of the plurality of preset roles to the second user, the access being provided via user portals accessed by each of the first and the second user.

2. The method of claim 1, wherein the collaboration area request is received using a portal application and the collaboration area is produced as an area in the portal application, the portal application including at least one of a view and a page, the at least one of the view and the page defined in the collaboration area template.

3. The method of claim 1, wherein the collaboration area comprises a plurality of pages and a plurality of views on one or more of the plurality of pages.

4. The method of claim 1, wherein the collaboration area parameters further specify one or more collaboration services to be made available to at least some of the users of collaboration area.

5. The method of claim 1, wherein the collaboration area parameters specify access roles that are available in the collaboration area.

6. The method of claim 1, further comprising generating invitations to one or more potential participants of the collaboration area to invite the one or more potential participants to become users of the collaboration area.

7. The method of claim 1, further comprising receiving customization commands after establishing the collaboration area to customize the operation of the collaboration area.

8. The method of claim 7, wherein the collaboration area customization commands comprise commands to select additional users for the collaboration area.

9. The method of claim 1, further comprising associating roles with the collaboration area that control access by one or more potential participants to the collaboration area.

10. The method of claim 1, further comprising, before receiving the collaboration area request, providing to the application a list of collaboration area template structures, and receiving a selection from among the list.

11. The method of claim 1, further comprising receiving a second collaboration area request associated with the collaboration area that identifies a second collaboration area template structure;
- receiving one or more second collaboration area parameters relating to the second collaboration area template structure; and
- establishing a second collaboration area within the collaboration area having content that is a function of the second collaboration area template structure and the received one or more second collaboration area parameters, the second collaboration area being accessible to a subset of the users in the collaboration area, the collaboration area and the second collaboration area being accessible through a same portal application.

12. The method of claim 11, wherein the second collaboration request is received from a different application than the collaboration request.

13. The method of claim 1, wherein the collaboration area is accessible to a plurality of collaboration area users.

14. A method for generating a collaboration area that facilitates collaboration on a project between members of an enterprise in a portal on one or more computers, the method comprising:
- accessing, at the one or more portal computers, a plurality of stored collaboration area template structures that each comprise a content workset and a template workset, the content workset defining a default set of content available in the collaboration area, the template workset defining a plurality of preset roles that are assignable to users who access the collaboration area, each of the plurality of preset roles comprising a different a set of default permissions to access one or more resources of the collaboration area;
- receiving, at the one or more computers a selection of one collaboration area template structure from the plurality of stored collaboration area template structures;
- providing, at the one or more computers a parameter list having a plurality of entries associated with the one selected collaboration area template structure;
- receiving, at the one or more computers values for the plurality of entries, the entries comprising a name of the collaboration area, a designation of an owner of the collaboration area, a subset of the default set of content to be made available to each of the plurality of roles, and an assignment of users of the collaboration area to one or more of the plurality of preset roles, the assignment of authorized users comprising assigning a first member of the enterprise to a first of the plurality of preset roles if the first member's position within the enterprise is sufficient for the set of default permissions of the first of the plurality of preset roles and a second member of the enterprise to a second of the plurality of preset roles if the second member's position within the enterprise is sufficient for the set of default permissions of the second of the plurality of preset roles;
- mapping the entries to the collaboration area template structure to moth the default set of content and the set of default permissions associated with the plurality of preset roles in accordance with requirements of the project to form an instance of the collaboration area in the portal;
- providing, to the owner via an owner display portal, access to all of the default set of content; and
- providing access to the subset of the default content associated with the first of the plurality of preset roles to the first user and access to the subset of the default content associated with the second of the plurality of preset roles to the second user, the access being provided via user portals accessed by each of the first and the second user.

* * * * *